United States Patent
Backus et al.

(10) Patent No.: US 7,525,836 B2
(45) Date of Patent: *Apr. 28, 2009

(54) NON-IMPRINTING MEMORY WITH HIGH SPEED ERASE

(75) Inventors: Robert M. Backus, Lucas, TX (US); Charles F. Duffey, Flower Mound, TX (US); Andrew C. Weil, Dallas, TX (US); Swati V. Joshi, Plano, TX (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/103,613

(22) Filed: Apr. 15, 2008

(65) Prior Publication Data

US 2008/0192553 A1    Aug. 14, 2008

Related U.S. Application Data

(63) Continuation of application No. 11/402,696, filed on Apr. 12, 2006, now Pat. No. 7,379,325.

(60) Provisional application No. 60/751,263, filed on Dec. 16, 2005.

(51) Int. Cl.
    *G11C 11/00* (2006.01)
(52) U.S. Cl. ............ 365/156; 365/185.04; 365/189.05
(58) Field of Classification Search ................ 365/154, 365/156, 185.04, 189.05, 230.08
    See application file for complete search history.

(56) References Cited

U.S. PATENT DOCUMENTS

| | | | |
|---|---|---|---|
| 4,864,544 A * | 9/1989 | Spak et al. ............. | 365/230.08 |
| 5,146,225 A | 9/1992 | Theus | |
| 5,237,219 A * | 8/1993 | Cliff ........................... | 326/38 |
| 6,490,646 B1 | 12/2002 | Leydier | |
| 7,379,325 B1 * | 5/2008 | Backus et al. ............... | 365/154 |
| 2007/0150887 A1 | 6/2007 | Shapiro | |

* cited by examiner

*Primary Examiner*—Gene N. Auduong
(74) *Attorney, Agent, or Firm*—North Weber & Baugh LLP

(57) ABSTRACT

A memory cell includes a master cell storing first true/complement data and a slave cell storing second true/complement data. A first circuit associated with the slave cell is operable responsive to a first clock signal to copy first true/complement data from the master cell into the slave cell with same state to be the second true/complement data. A second circuit associated with the master cell is operable response to a second clock signal, which is a non-overlapping complement of the first clock signal, to copy second true/complement data from the slave cell into the master cell with complementary state to be the first true/complement data. A read/write circuit includes circuitry for supporting true/complement data read and write operations with respect to the master cell in either same polarity or opposite polarity state. A state machine tracks polarity state of the first true/complement data so as to control whether a same polarity or opposite polarity state read operation is performed by the read/write circuit.

21 Claims, 1 Drawing Sheet

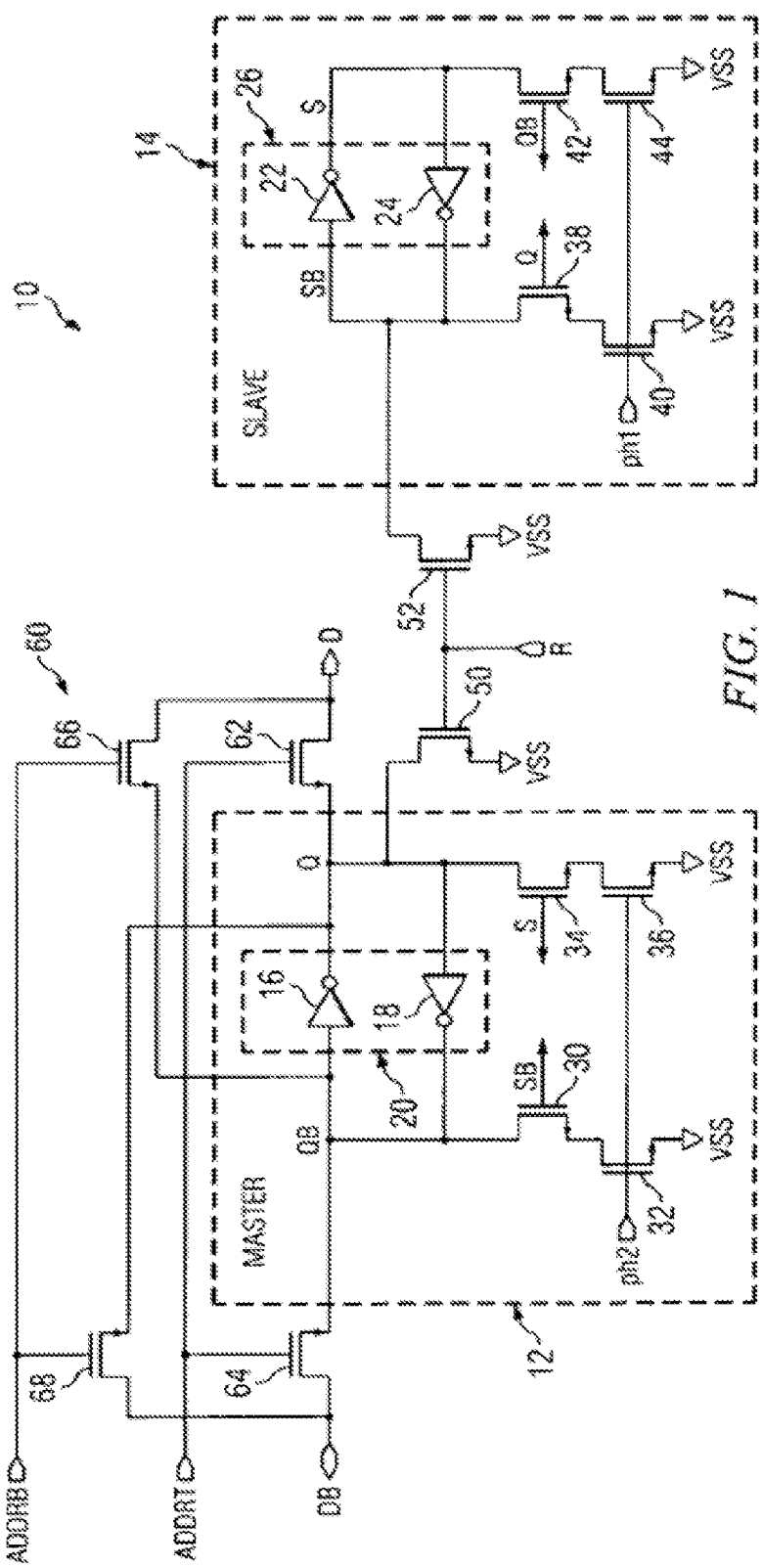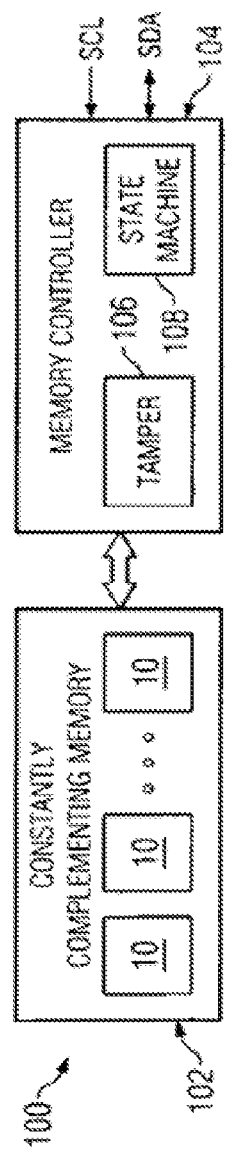
FIG. 1
FIG. 2

NON-IMPRINTING MEMORY WITH HIGH SPEED ERASE

CROSS REFERENCE TO RELATED PATENT APPLICATIONS

This application is a continuation of and claims priority under 35 U.S.C. §120 to the U.S. patent application entitled "Non-Imprinting Memory with High Speed Erase," Ser. No. 11/402,696, filed Apr. 12, 2006 now U.S. Pat. No. 7,379,325, which claims priority to U.S. Provisional Application, Ser. No. 60/751,263, filed Dec. 16, 2005, the disclosure of which is hereby incorporated by reference in its entirety.

BACKGROUND

A. Technical Field

The present invention relates to memories and, in particular, to memories which are non-imprinting and may be reliably and quickly erased.

There are known in the art a number of devices which include a memory for storing information. In some applications of such devices, such as where the device or system requires the storage of information comprising secret, confidential and/or sensitive data, including data such as cryptographic keys, algorithms or identity information. It is a critical system requirement with respect to such device applications to protect the stored information from improper or unauthorized access.

Many of these devices include a functionality for actively detecting an impending attack against the device (such as might occur when an unauthorized attempt is being made to gain access to the information stored in the memory). In response to the detection of such an attack, it is imperative that all secret, confidential and/or sensitive data stored in the memory be erased. In order to minimize, if not eliminate, the risk of access being gained to this information, the erasure of memory contents must be quickly and reliably accomplished by the device itself. The functionality necessary to achieve these goals can be costly and complex.

Many memory cell designs and technologies such as conventional static random access memory (SRAM) all share a common susceptibility to "data imprinting" which refers to a property of the memory to effectuate long term storage of data. In the case of SRAM implementations, the mechanisms for this relate to stresses placed on the gate oxide of a memory cell transistor during operation. These stresses arise as a result of the presence of a constant bias voltage on the memory cell over an extended period coupled with the cell being configured to store data of a certain logical value. This stress can lead to gate oxide charge accumulation which over time can progress to such a degree that it influences the power up state of the memory cell or leave sufficient data remnants which can be passively detected through advanced spectrographic analysis. Thus, the data, which was stored, is said to have left a permanent imprint through the stress induced oxide charge accumulation, and this imprint can be detected, and thus the logic state of the previously stored data identified, for a period of time long after power has been removed from the memory and/or the data has been purposefully erased. A number of active and passive methods are known in the art for discovering the state of an imprinted memory cell. To the extent that the memory cell stored secret, confidential and/or sensitive information, the imprinting would defeat any security actions to erase the cell which were taken in response to a detected impeding attack against the device. This, of course, jeopardizes consumer trust in the device and can result in severe damages, which threaten electronic banking systems, facilitate identity theft, defeat access control systems or even more serious issues pertaining to national security.

Presently, the problem of imprinting is addressed by having the host central processing unit (CPU) alter or move data such that the secret, confidential and/or sensitive information does not remain in one memory location for a long enough period of time to imprint. However, designers and manufacturers of these devices or systems may choose not to implement this solution not only due to cost constraints, but also because the actions taken to move the data raise reliability issues (i.e., can the correct state and location of the data be tracked accurately and thus known) and because the read/write operations required for this solution require the consumption of significant amounts of power (which is unacceptable in power sensitive devices). Additionally, attack windows, although narrow, are nonetheless present and can be exploited to gain access to the secret, confidential and/or sensitive information.

As discussed above, in response to a detected impending attack against the device actions are taken by the device to erase all secret, confidential and/or sensitive data stored in the memory. There are problems, however, with the methods by which data is erased. One commonly used technique removes power from the memory and pulls supply voltage to a negative potential. Another technique causes the host CPU for the device to wake up in response to the detected threat and sequentially write to each memory location and thus overwrite the previously stored secret, confidential and/or sensitive data. Unfortunately, as is known in the art, each of these techniques can be relatively easily defeated and thus give a thief an opportunity to obtain access to the data.

In summary, at least two problems exist with conventional memory configurations. First, windows exist which provide sufficient time for data imprinting to take place. Second, the memories can not be reliably and quickly erased. There would be an advantage if means were provided for reliably and quickly erasing all or part of a non-imprinting memory which stores secret, confidential and/or sensitive information.

SUMMARY OF THE INVENTION

In accordance with this specific embodiment of the invention, a random access memory cell comprises a master cell storing true/complement data and a slave cell storing true/complement data. A circuit interconnects the master cell and slave cell. This circuit receives first and second non-overlapping clock signals and is operable responsive to a change in state of the first clock signal to copy the true/complement data from the master cell for same polarity storage in the slave cell, and is further operable responsive to a change in state of the second clock signal to copy the true/complement data from the slave cell for opposite polarity storage in the master cell.

In accordance with another embodiment, a memory cell comprises a master cell storing first data and a slave cell storing second data. A first circuit is associated with the slave cell and operates responsive to a first control signal to copy first data from the master cell into the slave cell with same state to be the second data. A second circuit is associated with the master cell and operates response to a second control signal to copy second data from the slave cell into the master cell with complementary state to be the first data.

In accordance with yet another embodiment, a device comprises a memory cell including a master cell storing first data, a slave cell storing second data, a first circuit associated with the slave cell and operable responsive to a first control signal to copy first data from the master cell into the slave cell with same state to be the second data, and a second circuit associated with the master cell and operable response to a second control signal to copy second data from the slave cell into the master cell with complementary state to be the first data. The device further comprises a state machine which is operable to track over time a polarity of the first data which is stored in the master cell of the memory cell.

In another embodiment, a circuit comprises a master memory cell storing first true/complement data and a slave memory cell storing second true/complement data. A first circuit is associated with the slave cell and operates responsive to a first clock signal to copy first true/complement data from the master memory cell into the slave memory cell with same state to be the second true/complement data. A second circuit is associated with the master memory cell and operates response to a second clock signal, which is a complement of the first clock signal, to copy second true/complement data from the slave memory cell into the master memory cell with complementary state to be the first true/complement data. A read/write circuit includes circuitry for supporting true/complement data read and write operations with respect to the master memory cell in either same polarity or opposite polarity state. A state machine tracks polarity state of the first true/complement data so as to control whether a same polarity or opposite polarity state read operation is performed by the read/write circuit.

The above summary of the invention is not intended to represent each embodiment or every aspect of the present invention. In principle, an embodiment of the present invention concerns a memory device wherein no single data storage entity is capable of leaving any traceable remnants of previously stored data. A particular technique for accomplishing this goal is through the constant (or timely) exchange of data states between primary and secondary elements which comprise each date storage entity. The memory device is preferably formed of a plural number of data storage entities as described above, perhaps organized in the form of an array. In accordance with an aspect of the invention, the plurality of data storage entities, of limitless size, can be simultaneously erased.

The data storage entity may, in one implementation, comprise a transistor-based memory circuit. It will be understood, however, that the invention applies to any memory technology subject to imprinting concerns (for example, ferro-magnetic memory devices, quantum memory devices, organic memory devices, biologic memory devices, and the like).

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 1 is a schematic diagram of a circuit for implementing a non-imprinting memory cell with high speed erase in accordance with an embodiment of the invention; and FIG. 2 is a block diagram of a device within which the non-imprinting memory cell with high speed erase (signal R) of FIG. 1 may be advantageously used.

DETAILED DESCRIPTION OF THE DRAWINGS

Reference is now made to FIG. 1 wherein there is shown a schematic diagram of a circuit for implementing a non-imprinting memory cell with high speed erase in accordance with an embodiment of the invention. The memory cell 10 includes a master memory cell 12 and a slave memory cell 14 which are interconnected with each other. It will be recognized and understood that the cell 10 can comprise just a single cell (for storing a single bit) of a multi-bit memory of any suitable arrangement. Although the memory cell 10 is illustrated for exemplary convenience as a transistor-based memory device, it will be understood that the memory cell 10 can comprise any type of memory device which is subject to concerns over imprinting. For example, the memory cell may alternatively comprise a ferro-magnetic-based device, a quantum-based device, a organic-based device or a biologic-based device. The master and slave cells 12 and 14 are also illustrated for exemplary convenience as a transistor-based devices, but it will be understood that the cells 12 and 14 will be of the same type (ferro-, quantum-, organic- and biologic-) as the cell 10 to which they pertain.

The master cell 12, in the exemplary transistor-based design, includes first and second inverters 16 and 18, respectively, which are head-to-tail coupled to form a first latch 20. More specifically, the output of inverter 16 at node Q is coupled to the input of inverter 18, while the output of inverter 18 at node QB is coupled to the input of inverter 16. In this way, the first latch 20 stores data at node Q, while its complement is stored on node QB.

Similarly, the slave cell 14, in the exemplary transistor-based design, includes first and second inverters 22 and 24, respectively, which are head-to-tail coupled to form a second latch 26. More specifically, the output of inverter 22 at node is coupled to the input of inverter 24, while the output of inverter 24 at node SB is coupled to the input of inverter 16. In this way, the second latch 26 stores data at node S, while its complement is stored on node SB.

Node QB in the master cell 12 is coupled to ground through drain-source series connected nMOS 30 and nMOS 32. A gate of nMOS 30 is coupled to node SB of the slave cell 14. Node Q in the master cell 12 is coupled to ground through drain-source series connected nMOS 34 and nMOS 36. A gate of nMOS 34 is coupled to node S of the slave cell 14. The gates of nMOS 32 and nMOS 36 both receive a clock signal ph2.

Node SB in the slave cell 14 is coupled to ground through drain-source series connected nMOS 38 and nMOS 40. A gate of nMOS 38 is coupled to node Q of the master cell 14. Node S in the slave cell 14 is coupled to ground through drain-source series connected nMOS 42 and nMOS 44. A gate of nMOS 42 is coupled to node QB of the master cell 12. The gates of nMOS 40 and nMOS 44 both receive a clock signal ph1.

The clock signals ph1 and ph2 are non-overlapping, and are generated by a state machine (see, FIG. 2) using conventional techniques.

Node Q in the master cell 12 is further coupled to ground through the drain-source circuit of nMOS 50. Node SB in the slave cell 14 is further coupled to ground through the drain-source circuit of nMOS 52. The gate terminals of nMOS 50 and nMOS 52 both receive a reset signal R. Upon a power-up event, the reset signal R is pulsed high (perhaps by the state machine or other control device such as a central processing unit or a power on reset circuit). With gates of nMOS 50 and nMOS 52 both at logic high, these transistors are turned on and nodes Q and SB are driven to ground voltage. Through operation of the first latch 20, complement node QB is accordingly set to logic high. Similarly, through the operation of the second latch 26, complement node S is accordingly set to logic high. In this way, at reset, the master and slave cells 12 and 14, respectively, of the memory cell 10 are set to a known initial state (for example, low and high, respectively).

The reset signal R is also activated by a tamper detect functionality (see, FIG. 2) which actively operates to detect an impending attack against a device which contains the memory cell 10 (such as might occur when an unauthorized attempt is being made to gain access to the information stored in the memory cell). In response thereto, the tamper detect functionality will pulse the reset signal R high. This turns on nMOS 50 and nMOS 52 and drives nodes Q and SB to ground voltage thus setting the memory cell 10 back to its known initial state (low and high). This clearing of the memory cell is accomplished both reliably and very quickly to thus thwart any attempt by the tamperer to gain access to secret, confidential and/or sensitive data which was stored in the memory cell 10. Where plural cells 10 are present in a memory, the reset signal R is simultaneously applied to all of those cells so as to effectuate a simultaneous erase of those cells. Advantageously, the reset signal R response circuit configuration with nMOS transistors 50 and 52 as shown supports substantially simultaneous reset of a plurality of cells 10 of essentially limitless size (i.e., in number).

The memory cell 10 is of no value unless it can be read from and written to. A read/write circuit 60 is accordingly provided to support read/write operations. The memory cell 10 is connected to a pair of complementary data (or bit) lines (or pins) labeled as nodes D and DB, respectively. An nMOS 62 is drain-source circuit connected between node D and node Q, while an nMOS 64 is drain-source circuit connected between node DB and node QB. The gates of nMOS 62 and nMOS 64 receive a true control signal ADDRT whose operation will be explained later. Conversely, an nMOS 66 is drain-source circuit connected between node D and node QB, while an nMOS 68 is drain-source circuit connected between node DB and node Q. The gates of nMOS 66 and nMOS 68 receive a complement control signal ADDRB whose operation will be explained later. The ADDRT and ADDRB signals are generated, responsive to an address decode for example which selects the memory cell 10, by a state machine (see, FIG. 2) using conventional techniques and in accordance with the conditions described herein.

To write into the memory cell 10, the desired data and its complement are applied to nodes D and DB. If one wishes to store non-inverted (i.e., true) data in the memory cell 10, then the ADDRT signal (true) is forced to logic high which turns on nMOS transistors 62 and 64 to set node Q to the logic state present at node D and node QB to the logic state present at node DB. Conversely, if one wishes to store inverted (i.e., false or complement) data in the memory cell 10, then the ADDRB signal (false) is forced to logic high which turns on nMOS transistors 66 and 68 to set node Q to the logic state present at node DB and node QB to the logic state present at node D. It will be noted, for either case, that the logic values loaded during the write operation into nodes Q and QB will also be applied to the gates of nMOS transistors 38 and 42, respectively, in the slave cell 14.

To read from the memory cell 10, and assuming one wishes to recover non-inverted (i.e., true) data, then the ADDRT signal (true) is forced to logic high which turns on nMOS transistors 62 and 64 to set node D to the logic state stored at node Q of the latch 20 and node DB to the logic state stored at node QB of the latch 20. Conversely, if one wishes to recover inverted (i.e., false or complement) data as read from the memory cell 10, then the ADDRB signal (false) is forced to logic high which turns on nMOS transistors 66 and 68 to set node D to logic state stored at node QB of the latch 20 and node DB to the logic state stored at node Q of the latch 20. The reason why support for reading both true and complement polarities with respect to the stored data must be supported will become clear with reference to operation of the memory cell to preclude imprinting.

The memory cell 10 addresses the imprinting issue by constantly inverting the data which is stored in the memory cell. This is accomplished through the interconnection of the master cell 12 and slave cell 14 as discussed above and the cooperative operation of the master and slave cells under the control of the clock signals ph1 and ph2. As mentioned previously, the clock signals ph1 and ph2 are non-overlapping inversions of each other. When the clock signal ph1 is logic high, nMOS 40 and nMOS 44 are turned on and the data stored in the master cell 12 is copied to the slave cell 14. This occurs through the operation of nMOS 38 and nMOS 42. Assuming ph1 is logic high, if Q is also logic high (and thus QB is logic low), nMOS 38 (whose gate is coupled to node Q) is turned on along with nMOS 40 to drive node SB of the slave cell 14 to ground. Operation of the latch 26 then sets node S to logic high. Thus, slave cell 14 is set identically to master cell 12. When the clock signal ph1 then goes to logic low, clock signal ph2 will become logic high at some time later, when this happens nMOS 32 and nMOS 36 are turned on and the data stored in the slave cell 14 is copied, with an inversion of state (i.e., a polarity change), to the master cell 12. This occurs through the operation of nMOS 30 and nMOS 34. Assuming ph2 is logic high, if S is also logic high (and thus SB is logic low), nMOS 34 (whose gate is coupled to node S) is turned on along with nMOS 36 to drive node Q of the master cell 12 to ground. Note here that this is exactly the opposite logic state for node Q from the starting point in time when ph1 first went to logic high. Operation of the latch 20 then sets node QB to logic high. Thus, master cell 12 is set complementarily to slave cell 14.

Since phi1 and ph2 are complementary clock signals, this copying, shuffling and inversion with respect to the stored data state among and between the master cell 12 and slave cell 14 of the memory 10 continues, back and forth, for so long as the clock signals continue to run. Importantly, the shuffling and inversion of the data prevents a constant voltage from being applied to the gate oxide of any one or more of the data storing transistors of the memory cell 10 for an excess amount of time, thus preventing oxide charge accumulation and the resulting imprinting problem from occurring. When a read or write operation needs to be performed with respect to the memory 10, the clocks are either stopped or ignored for the duration of the read/write. Thereafter, the clocks continue to drive the constantly inverting operation.

With each completed cycle of the clocks ph1 and ph2, the logic state of the data stored in the master cell 12 inverts. It is thus critical, if one wants to be able to properly read out the stored data (i.e., in the correct original state), to keep track of true versus complement state (or polarity) of the stored data as the clocks ph1 and ph2 run. The state machine (see, FIG. 2) referenced above is charged with the responsibility of tracking the polarity of the data stored in the master cell 12. This is where the ADDRT and ADDRB control signals, as well as the nMOS transistors 62-68 come back into play. By tracking data polarity, the state machine can determine which of the control signals ADDRT or ADDRB to assert when a read or write to the memory 10 needs to occur (and clock operation is paused or ignored).

Consider for a moment the exemplary operation described above where one cycle of the ph1 and ph2 clocks was completed. After that one cycle, the master cell 12 would be storing the complement of the originally stored data. Assuming a read of the data stored in the master cell 12 needed to occur at this time, the state machine would assert the ADDRB control signal and activate nMOS transistors 66 and 68. The reason for this is that the drain-source connections of nMOS transistors 66 and 68 are configured to place data from the complement node QB of the latch 20 on the true data node D, while placing the data from the true node Q of the latch 20 on the complement data node DB. In this way, the read/write circuit 60 inverts the stored data in the master cell 12 and thus corrects for the data inversion implemented through the completed first cycle of the clocks ph1 and ph2.

Now, if the clocks were to proceed for another cycle, it would be recognized that the copying, shuffling and inversion operation, in a manner similar to that described above, would return the master cell 12 back to its initial data state. Assuming a read of the data stored in the master cell 12 needed to occur at this time, the state machine would assert the ADDRT control signal and activate nMOS transistors 62 and 64. The reason for this is that the drain-source connections of nMOS transistors 62 and 64 are configured to place data from the true node Q of the latch 20 on the true data node D, while placing the data from the complement node QB of the latch 20 on the complement data node DB. In this way, the read/write circuit 60 does not invert the stored data in the master cell 12.

Given the foregoing, it will be noted that after a certain initial data polarity is established in the master cell 12 (for example, when a write is performed), the state machine need only keep track of the number of ph1/ph2 clock cycles which are completed thereafter. With that knowledge, the state machine can properly select the ADDRT or ADDRB control signal to assert when a read from the memory 10 needs to occur. For example, as shown above, for any odd numbered completed ph1/ph2 clock cycles, the ADDRB control signal should be asserted during read (since an inversion of the original data has occurred), while for any even numbered completed ph1/ph2 clock cycles, the ADDRT control signal should be asserted during read (since the inversion of the original data has been corrected). The state machine could use a simple single bit flag to track this data polarity issue. Thus, for each completed ph1/ph2 clock cycle, the state of the flag is changed between logic high and logic low, with the current flag logic state then used to select which one of the ADDRT or ADDRB control signal to assert when the clocks are subsequently stopped to allow for a read operation to be performed.

FIG. 1 illustrates the circuit for just a single bit (or cell 10) of what could be a much larger multi-bit memory (configured in a register or array format or the like as desired). Each bit of the memory would include both a master cell 12 and a slave cell 14. The memory cell 10 (bit) would be non-imprinting (through operation of the copying, shuffling and inversion operation described above) and support a quick and reliable data erase/reset (through use of the reset signal R). The state machine, which could be integrated with or separately from the memory, controls operation by performing the following operations: a) keeping track of data polarity and thus determining which one of the ADDRT or ADDRB control signals to assert, b) asserting ph1 and ph2 (two phases of a non-overlapping clock) to facilitate the bit copying, shuffling and inversion operation, and c) halting running of the ph1 and ph2 clock signals, or causing the clocks to be ignored, in the event a memory access (read or write) operation needs to be performed.

Although the transistor-based exemplary design is illustrated using n-channel transistors, it will be understood that an equivalent design could alternatively use p-channel devices, or a combination of n-channel and p-channel devices. The use of FET-type devices is similarly only exemplary, and an equivalent design could alternatively use bipolar devices.

Reference is now made to FIG. 2 wherein there is shown a block diagram of a device 100 within which the non-imprinting memory cell 10 with high speed erase of FIG. 1 may be advantageously used. The device 100 includes a constantly complementing memory circuit 102 comprised of a plurality of memory cells 10 which may be arranged in any selected architecture including a linear register and an array. The memory circuit 102 includes all necessary addressing circuitry to control selection of individual ones and/or groups of individual ones of the memory cells 10. This addressing circuitry may utilize address decoder and driver circuits which are well known to those skilled in the art. Integrating such circuits to activate memory cells 10 for read and write operations is well within the capabilities of those skilled in the art.

The device 100 further includes a memory controller circuit 104. The circuit 104 may comprise, for example, any suitable memory controller circuit including integrated controller circuits available from Maxim Integrated Products. Alternatively, the circuit 104 can comprise any suitable microcontroller, microprocessor, central processing unit or other programmable control device known in the art which can operation to control access to the memory 102.

The circuit 104 includes a tamper detection circuit 106. This circuit 106 can be implemented in any selected fashion known to those skilled in the art, including having the circuit as an embedded functionality within the memory controller integrated circuit chip. Generally speaking, the circuit 106 functions to actively detect an impending attack against the device 100 (such as might occur when an unauthorized attempt is being made to gain access to the information stored in the memory 102). In response thereto, the circuit 106 issues a reset signal R which is applied to each memory cell 10 within the memory 102 to set the memory cells 10 back to a known initial state. This clearing of the memory cells is accomplished both reliably and very quickly to thus thwart any attempt by the tamperer to gain access to secret, confidential and/or sensitive data which may be stored in the memory cells 10.

The circuit 104 supports an $I^2C$ 2-wire serial input/output bus through the SCL and SDA ports. While a 2-wire serial bus comprises a preferred I/O implementation for the device 100, other implementations based on SPI type, three or four wire interfaces have been implemented. It will of course be understood by those skilled in the art that the I/O functionality can take on any one of many available known forms including both serial and parallel configurations.

The circuit 104 includes the clock generating functionality for supplying the controlled ph1 and ph2 clock signals. The circuit further includes functionality for implementing the state machine 108 which is operable in the manner described above to control the copying, shuffling and inversion operation of the memory cells 10 of the constantly complementing memory 102.

Advantageously, the copying, shuffling and inversion operation performed by each of the memory cells 10 addresses the memory imprinting issue without requiring data to be moved around the memory 102. The address location for each piece of data need not change and thus there is no need for a controller or central processing unit to keep track of changing memory locations as with some prior art designs. Additionally, because the copying, shuffling and inversion operation is effectuated through a circuit under the control of a clock signal, significant controller or central processing unit oversight is not required. Still further, the circuit and clock signal design shown in FIG. 1 requires much less power to operate than other prior art imprinting solutions. Yet another advantage of the circuit of FIG. 1 resides in the simplicity of the reset operation where a single reset line can be pulsed to quickly, effectively and reliably cause large numbers of memory cells to be cleared (reset) of data.

Generally speaking, the device 100 within which the non-imprinting memory cell 10 with high speed erase of FIG. 1 can be advantageously used can be: 1) a Secure Transaction Terminal, such as is involved with the exchange of financial information; 2) Software Defined Radio Equipment; 3) Trusted Computing and Public Key Infrastructure Equipment; or 4) Physical Access Control Equipment.

With respect to Secure Transaction Terminals, these devices are also commonly referred to as Point of Sale (POS) terminals (or Credit Card terminals). They are used anywhere credit cards are accepted. By sliding the magnetic strip side of the credit card through a slot, information is read by the terminal and the transaction is performed. With respect to the present invention, a non imprinting memory would provide benefits to this equipment with respect to protecting the confidential information extracted from credit cards. Additionally, the non imprinting memory could also form a part of a credit card itself to store confidential information.

With respect to Software Defined Radio Equipment, this refers to the secure radios often used by the military, police, fire fighters, ambulance, border security, healthcare, transportation. These radios are typically used in environments where secure communications are necessary (i.e., the parties to the communication must be verified and the communications themselves must be protected against eavesdropping). These radios may operate over a special network and require that an authentication key be verified in order for the communication to be established. With respect to the present invention, a non imprinting memory would provide benefits to this equipment with respect to protecting the secret keys or codes needed for authenticating parties to the communications or establishing the communications links.

With respect to Access Control and PKI, these two subjects are closely related within the scope of the present invention. The access control market has traditionally been one of the largest markets for authentication devices. As the needs for increased security have been escalated, this industry is facing the need to make significant upgrades to their equipment through more advanced encryption and authentication techniques. Access control products fall into two arenas: 1) Physical access control relates to allowing access to Facilities such as Buildings, Transportation systems, etc.; and 2) Information access control relates to the access of digital information such as website content, corporate Intranets etc. In each of these cases, there exists a central trusted point which issues, validates and administrates encryption key information. The purpose of this is to provide a trusted source of information which can validate digital signatures to be genuine. The systems that perform this utilize both asymmetrical and symmetrical encryption techniques. However, the most critical part of the process is the generation of asymmetrical public and private key pairs through a process known as RSA. During the key generation process, the user and PKI administrator establish each others identity through a process suitable to both parties. Once this root of trust has been accomplished the PKI cooperates with the users computer, smart card or other suitable digital device to generate and issue a digitally signed certificate based upon the users public and private key pair. The user's private key is never to be provided outside the users control and must assure it remains un-compromised. For if the users private key(s) got out, there identities could be stolen giving the attacker access to all facilities granted by the PKI's certificate. An even more terrifying scenario exists if the PKI's private keys were stolen, as this could result in a wide scale attack on all users who depend upon the PKI's security. Although there are secondary measures which can be employed in order to mitigate this threat (PIN PADS, Biometrics, Compartmentalized System Administration etc.), it is clear that the storage of digital certificates and their associated private keys must be diligently managed and protected. This PKI or central point can take many forms depending upon the size and scope of the information which requires protection and authentication. This can range from governments to private enterprises. The equipment utilized consists of servers equipped with dedicated cryptographic coprocessors, specialized software, highly secure networks and infrastructure interfaces. All of which is stored and administrated in a suitably secure facility. With respect to the present invention, a non imprinting memory would provide benefits to equipment used on both the client and PKI's side of an authentication/access control system and would include any digital device which stores and processes RSA or other asymmetrical encryption algorithms and their associated keys.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

We claim:

1. A non-imprinting memory system comprising:
a plurality of memory cell rows that store a plurality of bits, each memory cell row within the plurality of memory cell rows comprising a set of memory cells and a state identifier;
a shared slave memory cell row that is coupled to the plurality of memory cell rows and that stores a copy of a first set of bits from a first memory cell row within the plurality of memory cell rows; and
a memory controller, coupled to the plurality of memory cell rows and the shared slave memory cell row, the memory controller causing the first set of bits stored within the first memory cell row to toggle to a first complimentary set of bits and changing a state identifier value associated with the first set of bits.

2. The memory system of claim 1 wherein the memory controller toggles the first set of bits to the first complimentary set of bits at symmetrical time intervals.

3. The memory system of claim 1 wherein the memory controller causes a second set of bits stored within a second memory cell row to toggle to a second complimentary set of bits.

4. The memory system of claim 3 wherein the first set of bits is stored within the shared slave memory cell row during a first time interval and the second set of bits is stored within the shared slave memory cell row during a second time interval, the first and second time intervals having an equal length and being sequential.

5. The memory system of claim 1 wherein the memory controller determines whether an access command is operating on at least one bit within the first set of bits prior to toggling the first set of bits to the first complimentary set of bits.

6. The memory system of claim 5 wherein the memory controller waits to toggle the first set of bits in response to the access command operating on the at least one bit within the first set of bits.

7. The memory system of claim 1 wherein the state identifier stores a single bit associated with a polarity state of the first set of bits.

8. The memory system of claim 1 wherein the plurality of memory cell rows, the shared slave memory cell row and the memory controller are integrated on the same semiconductor substrate.

9. The memory system of claim 1 wherein the plurality of memory cell rows are configured in a static random access memory configuration.

10. The memory system of claim 1 wherein the plurality of memory cell rows comprises memory cells selected from a group consisting of ferro-magnetic memory cells, quantum memory cells, organic memory cells, and biologic memory cells.

11. A method for toggling a bit and complimentary bit within a memory cell, the method comprising:
    storing a first value within the memory cell for a first period of time, the first value representing a true value of the bit;
    determining whether an access command is operating on the memory cell at the end of the first period of time;
    storing a second value within the memory cell in response to a determination that an access command is not operating on the memory cell, the second value representing a complimentary value of the bit;
    maintaining the second value with the memory cell for a second period of time, the second period of time being approximately equal to the first period of time.

12. The method of claim 11 wherein the step of storing the second value within the memory cell is delayed in response to a determination that the access command is operating on the memory cell.

13. The method of claim 12 wherein the second value is stored within the memory cell after the access command on the memory cell has completed.

14. The method of claim 11 wherein the access command is a read command from a controller.

15. The method of claim 11 wherein the access command is a write command from a controller.

16. Memory control circuitry for a non-imprinting memory, the control circuitry comprising:

a bit toggling control module that is coupled to a plurality of memory cell rows and that controls toggling of bits within the plurality of memory cell rows between a bit value and a complimentary value;

a state module that is coupled to the plurality of memory cell rows and that defines a state associated with each memory cell row within the plurality of memory cell rows; and a tamper response module that is coupled to the plurality of memory cell rows and that is configured to erase each memory cell row within the plurality of memory cell rows in response to a detected tampering of at least one cell within the plurality of memory cell rows.

17. The memory control circuitry of claim 16 wherein the bit value and the complimentary value are stored within a memory cell in the plurality of memory cell rows for approximately the same time period.

18. The memory control circuitry of claim 16 further comprising an interface on which pending access commands to the plurality of memory cell rows are identified.

19. The memory control circuitry of claim 18 wherein the bit toggling control module causes a delay in a toggling of a first bit value to a first complimentary bit value within a first memory cell in response to a detection of an access command operating on the first memory cell.

20. The memory control circuitry of claim 16 further comprising:
    a first interface that is coupled to the plurality of memory cell rows and on which toggling commands are communicated relating to bit values stored within bits in the plurality of memory cell rows; and
    a second interface that is coupled to a shared slave memory cell row and that receives information relating to a set of bits to be toggled within the plurality of memory cell rows.

21. The memory control circuitry of claim 16 wherein the plurality of memory cell rows comprises memory cells selected from a group consisting of ferro-magnetic memory cells, quantum memory cells, organic memory cells, and biologic memory cells.

* * * * *